(12) United States Patent
Rowe

(10) Patent No.: US 8,332,897 B1
(45) Date of Patent: Dec. 11, 2012

(54) REMOTE RENDERING OF WEBPAGES ON TELEVISION

(75) Inventor: Simon M. Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/291,557

(22) Filed: Nov. 8, 2011

(51) Int. Cl.
*H04N 7/18* (2006.01)
*H04N 7/173* (2006.01)
*H04N 7/16* (2006.01)
*H04N 7/12* (2006.01)
*H04N 11/02* (2006.01)
*H04N 11/04* (2006.01)
*H04B 1/66* (2006.01)

(52) U.S. Cl. ..... 725/81; 725/118; 725/141; 375/240.01; 345/2.3

(58) Field of Classification Search .................. None
See application file for complete search history.

(56) References Cited

U.S. PATENT DOCUMENTS

| 7,478,417 | B2 | 1/2009 | Sakamoto et al. |
| 2001/0031006 | A1 | 10/2001 | Wang et al. |
| 2002/0133828 | A1 | 9/2002 | Foster |
| 2002/0188440 | A1 | 12/2002 | Foster et al. |
| 2005/0180728 | A1* | 8/2005 | Ichioka et al. ............... 386/46 |
| 2006/0037054 | A1* | 2/2006 | McDowell et al. .......... 725/80 |
| 2007/0067808 | A1* | 3/2007 | DaCosta ....................... 725/62 |
| 2007/0074269 | A1* | 3/2007 | Hua ............................. 725/151 |
| 2007/0250870 | A1 | 10/2007 | Kim et al. |
| 2008/0120661 | A1 | 5/2008 | Ludvig et al. |
| 2008/0163317 | A1 | 7/2008 | Mills |
| 2008/0199144 | A1 | 8/2008 | Hailey et al. |
| 2009/0150962 | A1 | 6/2009 | Kim et al. |
| 2009/0222422 | A1 | 9/2009 | Yoon et al. |
| 2010/0050083 | A1 | 2/2010 | Axen et al. |
| 2010/0095332 | A1 | 4/2010 | Gran et al. |

* cited by examiner

*Primary Examiner* — Mark D Featherstone
(74) *Attorney, Agent, or Firm* — Fish & Richardson P.C.

(57) ABSTRACT

The subject matter of this specification can be embodied in, among other things, a method that includes receiving, at a user device, a resource referenced by a resource address, wherein the resource defines a resource page; determining, at the user device, that a television device can display transcoded video content; in response to determining that the television device can display transcoded video content: rendering, by the user device, the resource page according to the dimensions of the television device, transcoding, by the user device, the rendered resource page into transcoded video content for which the television has the processing capability to display, and providing, by the user device, the transcoded video content to the television device for display on the television device.

12 Claims, 3 Drawing Sheets

REMOTE RENDERING OF WEBPAGES ON TELEVISION

TECHNICAL FIELD

This specification relates to television processing.

BACKGROUND

Some personal electronic computing devices, such as laptop computers and smartphones, are capable of presenting content retrieved from the Internet and other networks. These devices are generally designed to provide such content to the user in a personal manner, e.g., the device is generally configured for use and viewing by a single user. In some cases, this content includes web page content that is viewable on the personal electronic computing devices.

Display devices, such as televisions, may generally display video content provided by terrestrial broadcasts, or by cable and satellite programming providers. High definition televisions (HDTVs) are generally capable of decoding video content compressed according to the MPEG-2 and H.264 standards.

In addition to decoding and displaying compressed broadcast video, some display devices are capable of connecting to a network in order to present video content retrieved from networked personal computers and/or from Internet-based sources such as online movie rental services. In general, these display devices provide the user with a user interface with which the user interacts in order to search for and select the content that is to be presented on the display device. However, the interfaces may be based on relatively poor human-interaction models when compared to full featured browser interfaces, and have little or no web rendering ability. Techniques to address the lack of web browsing in such display devices may include building a computer into the television, or inserting a separate set-top-box between the TV and its signal source.

SUMMARY

In general, one innovative aspect of the subject matter described in this specification can be embodied in methods that include the actions of receiving, at a user device, a resource referenced by a resource address, wherein the resource defines a resource page; determining, at the user device, that a television device can display transcoded video content; in response to determining that the television device can display transcoded video content: rendering, by the user device, the resource page according to the dimensions of the television device, transcoding, by the user device, the rendered resource page into transcoded video content for which the television has the processing capability to display, and providing, by the user device, the transcoded video content to the television device for display on the television device. Other embodiments of this aspect include corresponding systems, apparatus, and computer programs, configured to perform the actions of the methods, encoded on computer storage devices.

The systems and techniques described herein may provide one or more of the following advantages. In some implementations, the system exploits the Digital Living Network Alliance (DLNA) capability of the television to take advantage of the processing power of the user device, e.g., tablet/smart phone, and its superior web browsing capability. The user device becomes a DLNA server, with the television as its renderer, while retaining its own screen effectively as a touchpad and keyboard. The user device can thus optimally render the web for the dimensions of the TV, encode the video as MPEG and have the video displayed on the television. By leveraging existing capabilities, the remote display functionality can be realized with very little incremental costs.

This systems and techniques described herein also addresses the technical problem of screen sharing, as the user devices typically have different resolutions and aspect ratios from the television device. By modeling the television display as a separate output for the user device, the system can deliver video optimally scaled for the television. Additionally, the user device can identify itself to websites as a television, e.g., by using a television agent identifier, and thus obtain web pages which have been optimized for large screen viewing.

The systems and techniques described herein also enable a television display device that does not have the ability to render web page resources to essentially display such resources in the form of a video stream. Thus, the system realizes many of the advantages of a television display system that is web-capable without having to build another operating system, custom HDMI chips and additional hardware support.

The details of one or more implementations are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

This document describes systems and techniques for presenting Internet content on a television display device. In general, a computing device such as a smartphone, tablet computer, or personal computer is used to connect to the Internet and fetch Internet-based resources, e.g., web pages, videos, images, and display the resources on the generally larger screen of the television display device.

User computing devices, such as those mentioned already and generally referred to as "user devices," are generally capable of accessing, downloading, and presenting Internet based content, such as web pages, streaming multimedia, and web based applications. These user devices also tend to be updated and replaced on relatively short intervals, e.g., every 1-3 years, as new technology arrives. By replacing these devices relatively often, the user tends to possess devices that are close to the state of the art in terms of communications and Internet technologies. Such devices however may tend to have small display screens, and as such it is not always easy for one user to share the content of his or her screen with other users.

Televisions can be equipped with processors and web browser software, either internally or as an external peripheral device, to enable the televisions to act as web browsers.

Televisions, however, are generally purchased with the intent that they are to be used for five or ten years or longer, while Internet content standards tend to evolve much more rapidly. As such, such an Internet-enabled television display devices' display capability can often become incompatible with the latest Internet technology.

To reduce such obsolescence issues, a personal computing device can be used to access Internet resources. The personal computing device can then transcode the Internet resources into a format that can be streamed to, and presented by, the television display device. For example, some televisions are capable of displaying compressed video streams (e.g., MPEG) provided over a local network by an external computer device. By presenting Internet content on the television display device, the user can use the Internet technology of his or her personal computing device and the larger display area of the television to share Internet content with a larger local audience without needing to include Internet processing capabilities into the television itself. Additionally, in some implementations the personal computing device can act as a user input device for the Internet content presented on the television display device (e.g., pointer controller, keyboard).

Figure 1:
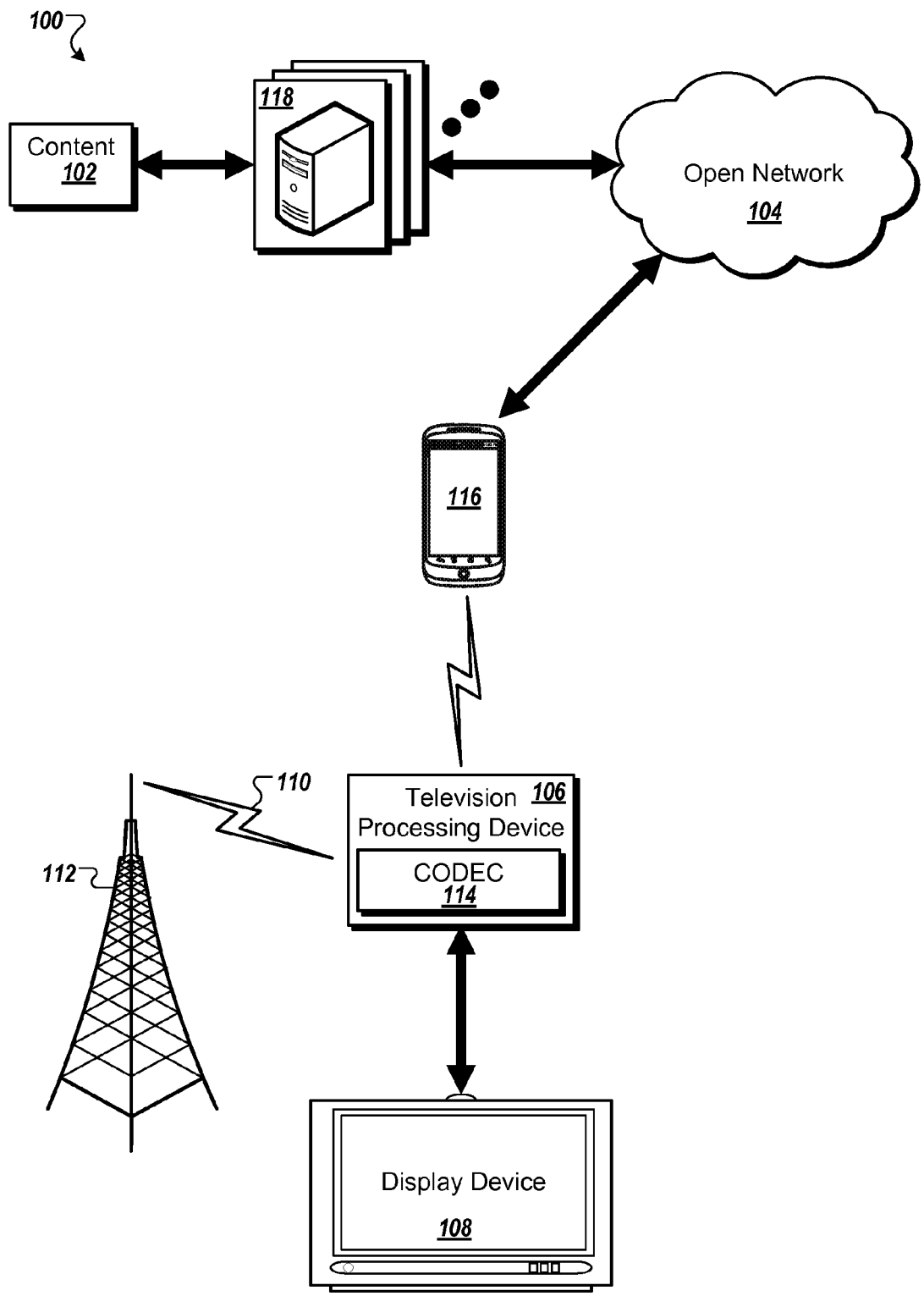
FIG. 1 is a block diagram of an example environment in which content extracted from an open network is provided to a television processing device for display on a television display device.

FIG. 1 is a block diagram of an example environment 100 in which content 102 extracted from an open network 104 can be provided to a television processing device 106 for display on a television display device 108. In general, the television processing device 106 processes signals 110 (e.g., terrestrial television broadcast signals, satellite television signals, cable television signals, Internet protocol television data streams) provided by a television provider 112 for display on the display device 108.

Users can browse the Internet for the content 102, such as web pages, videos, or other media content provided by a collection of media providers 118, e.g., web servers, using personal computing devices such as a user device 116. In some implementations, the media providers 118 provide web pages that include media content such as video, audio, still images, or other appropriate media. The user can then interact with the user device 116 to direct the television processing device 106 to display the content 102 on the display device 108.

The television processing device 106 includes a video codec module 114 that decodes compressed video, e.g., MPEG-2, MPEG-4, H.264, Theora. For example, the compressed video may encode as high definition television (HDTV) signals. In some implementations, the television processing device 106 can be a collection of video processing hardware integrated into the display device 108. In some implementations, the television processing device 106 can be a device that is external to the display device 108, such as a set-top box, a video game console, an Internet-connected DVD or Blu-Ray player, or other appropriate device that can provide the television broadcasts 110 and/or the content 102 for display by the display device 108.

The user device 116 connects to the open network 104, e.g., the Internet, through a wired or wireless connection. In some implementations, the user device 116 can be a personal computer, smartphone, netbook, tablet computer, pad computer, or any other appropriate form of electronic device that a user can interact with to browse for the content 102. In some implementations, the user device 116 can connect to the open network 104 through a private network such as a private local area network or a cellular data network.

In use, a user interacting with the user device 116 browses for the content 102 provided by the media providers 118. When the user comes across an item of the content 102 that he or she wants to view on the display device 108, e.g., to share an Internet web page with other people in the same room, to just display an Internet video on a television, to play an Internet based game on a larger screen, the user can command the user device 116 to send the content to the television processing device 106. The user device 116 may transcode the content 102 into a streaming video format that the CODEC 114 is capable of decoding, and provide the transcoded video content to the television processing device 106 to direct the television processing device 106 to display the content 102 on the television display device 108.

The user can thus browse and present the Internet content 102 through the television device 108. The user is able to share the content 102 with the entire group by using the television display device 108 rather than requiring the group to huddle around the relatively smaller screen of the user device 116, and do so without requiring the processing device 106 to provide rich browsing and user interface capabilities, or be capable of processing data encoded according to the latest encoding standards.

In some implementations, the user device 116 can be the source of the content 102. For example, the user device 116 may encode a copy of the content of its own display as a video stream, and provide the video stream to the television processing device 106 for display on the display device 108. In various implementations, the user device 116 may encode video footage, video conferencing, screen captures, static photos, real-time photos, or any other appropriate media that can be encoded by the user device 116 and provided to the television processing device 106.

In some implementations, the user device 116 may provide a temporary network address (e.g., URL) to the television processing device 106, and the television processing device 106 may pull the media encoded by the user device 116. In other words, the user device 116 acts as a server relative to the television processing device 106. For example, in the context of DLNA, the user device 106 acts as a DLNA server and uses the television processing device 106 as its renderer. In other implementations, the user device 116 may push the encoded media to the television processing device 106.

Figure 2:
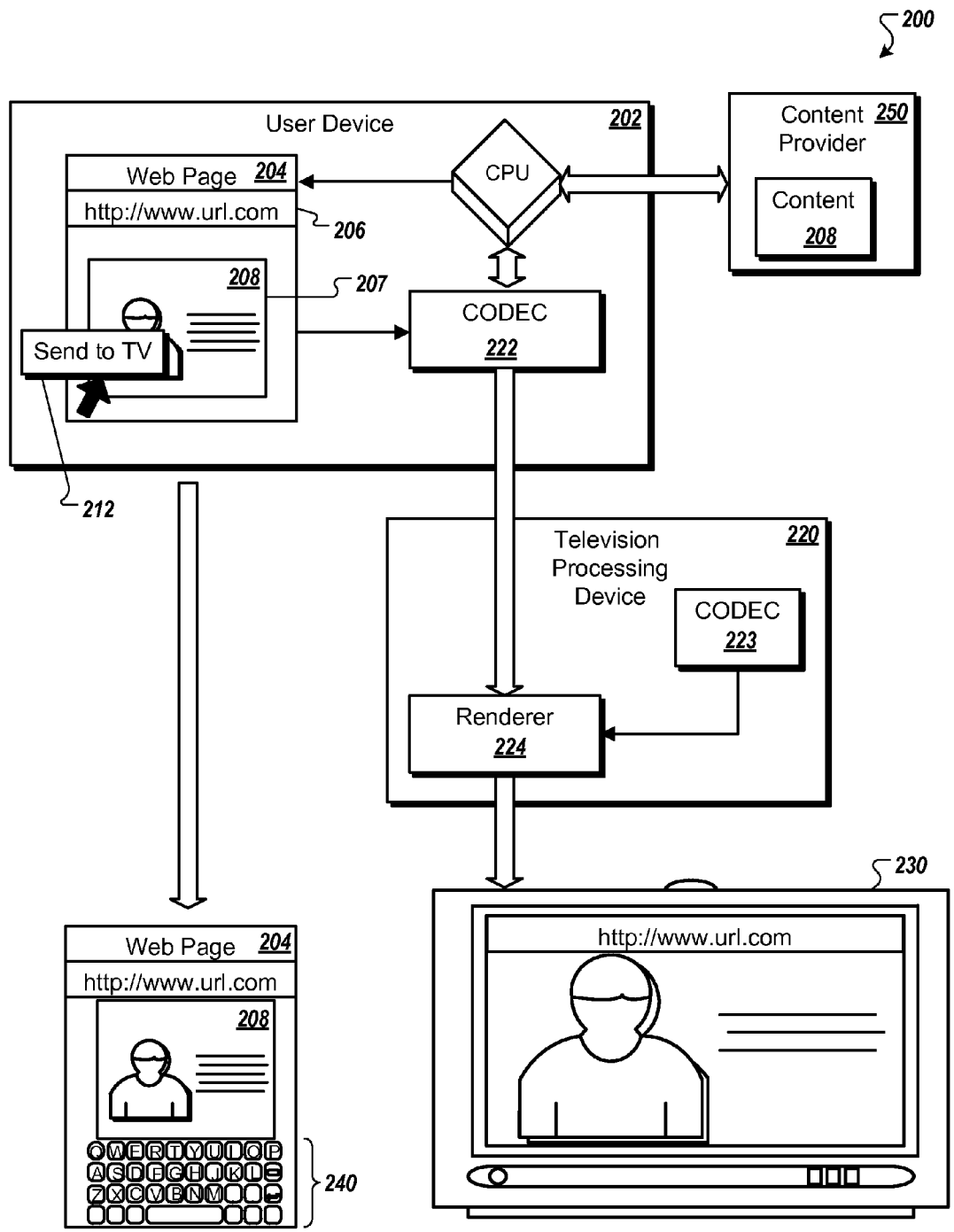
FIG. 2 is a block diagram illustrating an example flow for providing content to a television processing device by use of transcoding.

FIG. 2 is a block diagram illustrating an example flow 200 for providing content to a television processing device by use of transcoding. In some implementations, the flow 200 can be used in the environment 100 of FIG. 1.

The flow 200 starts when a user device 202 is used to browse a web page 204. In some implementations, the user device 202 can be the user device 116. The web page 204 is identified by a network address 206, such as a URL, that identifies a content provider 250 that provides the content 208 of the web page 204. The web page also includes a content display area 207 in which content 208 is presented. For example, the content 208 can be a text, images, multimedia, or any other appropriate item that can be embedded within the web page 204.

The user device 202 provides a user interface (UI) element 212, such as a button, pop up dialog, keyboard command, or other such device, the activation of which causes a television processing device 220 to display the content 208 on a display device 230 such as a television.

In the illustrated example, the user's selection of the UI element 212 requests the content 208 from the content provider 250 that hosts the content 208. The user device 202 processes the content 208 using a codec module 222. A codec module 223 decodes or decrypts the content 208 and converts the content 208 into a format that can be rendered by the rendering module 224.

In some implementations, the user device 202 can communicate processed content 208 and other information with the television processing device 220 over a network or other appropriate communications path. For example, the user device 202 and the television processing device 220 can communicate over a wired or wireless (e.g., Wi-Fi) Ethernet network, a Bluetooth connection, a ZigBee connection, an infrared connection (e.g., IrDA), or other appropriate wired or wireless communications path.

In some implementations, the television processing device 220 can be implemented as a Universal Plug and Play (UPnP) media renderer on a local area network, and the user device 202 can perform operations including instantiating the user device 202 as a UPnP control point present on a local area network, and discover and communicate with the television processing device 220 using a UPnP protocol. For example, the user device 202 can use a UPnP protocol to transmit the URL of a media stream to the television processing device 220, and then transmit a "play" command causing the television processing device 220 to present the content 208 as processed by the CODEC module 222. In some implementations, UPnP or other networking technology can be used by the user device 202 and the television processing device 220 to also perform tasks such as to dynamically join a network, obtain network addresses, announce their identities to peer devices, convey their capabilities upon request, learn about the presence and capabilities of other networked devices, leave a network substantially without leaving any unwanted state information behind, and perform other appropriate network tasks. In some implementations, UPnP or other networking technology can be used by the user device 202 and the television processing device 220 to also remotely control networked devices, move digital data in the form of audio, video and still images between networked devices, share information among networked devices and with the World Wide Web, and perform other appropriate media and information communications tasks.

In some implementations, the user device 202 can reformat the content 208 based on the capabilities of the display device 230. For example, the display device 230 may have a different aspect ratio relative to the user device 202, and the user device 202 may reformat the layout of the content 208 for the display device 230 before providing it to the CODEC module 222. In another example, the display device 230 may have a higher pixel resolution than the user device 202, and the user device may reformat or scale the content 202 before providing it to the CODEC module 222.

In some implementations, the television processing device 220 can make the user device 202 aware of its decoding abilities though a UPnP or other appropriate communications protocol. For example, the CODEC module 222 can encode the content 208 using a compression or encryption format that the television processing device 220 is configured to process.

In some implementations, the user device 202 may be the content provider 250. For example, the user device may host or create the content 208, wherein the content 208 can be media files stored on the user device 202, or the content 208 can be audio and/or video content dynamically created by the user device 202 (e.g., software running on the user device can generate an MPEG-2 or other appropriate audio and/or video stream).

The renderer module 224 formats the decoded content into a format that is compatible with the display device 230. For example, the renderer module 224 can convert the decoded content into HDMI, component, composite, DVI, VGA, SCART, or other video signal formats. The rendered content is then provided to the display device 230, which displays the content.

In some implementations, the user device 202 also displays a user control UI 240 with which the user can interact to control the display of the content 208 on the display device 230. In some implementations, the user control UI 240 can include pointer, keyboard, media playback, and any other user controls that are appropriate for interacting with the web page 204 and/or the content 208. For example, the user can interact with the user control UI 240 to type the URL 206. In another example, the user control UI 240 can act as a touchpad, and the user can sweep a finger across the user control UI to click or otherwise select items displayed as the content 208.

In some implementations, the media control UI 240 can be a collection of physical controls (e.g., buttons, keys) provided by the user device 202. In some implementations, the user device 202 can provide audio input, audio output, video input, video output, haptic feedback, positional input (e.g., accelerometers, gravity sensors, compass, GPS) or any other appropriate hardware input or output functions that may be used to interact with the content 208. For example, the content 208 may be a video chat web application, and the user device 202 may provide a video camera and microphone for capturing the user's end of the conversation.

In some implementations, content types other than web pages can be presented. For example, the user device 202 can be an audio device, and/or the television processing device 220 can be an audio-only processing device (e.g., an Internet radio). In such an example, the user device 202 can be playing stored or streamed audio content. The user device 202 can send a URL of the audio content to the television processing device 220 to cause the television processing device 220 to retrieve, decode, and play the audio content.

In some implementations, the television processing device 220 can process the content 208 to cause a picture-in-picture or side-by-side environment to be displayed on the display device 230. For example, the picture-in-picture environment can include a display region in which the television programming content is displayed and a region in which the content is simultaneously displayed. In some implementations, the regions can be resized such that both regions can be displayed substantially without overlap. In other implementations, at least one of the regions can be made relatively smaller than the other region such that the smaller region can partially overlap the larger while still permitting both regions to be substantially visible.

Figure 3:
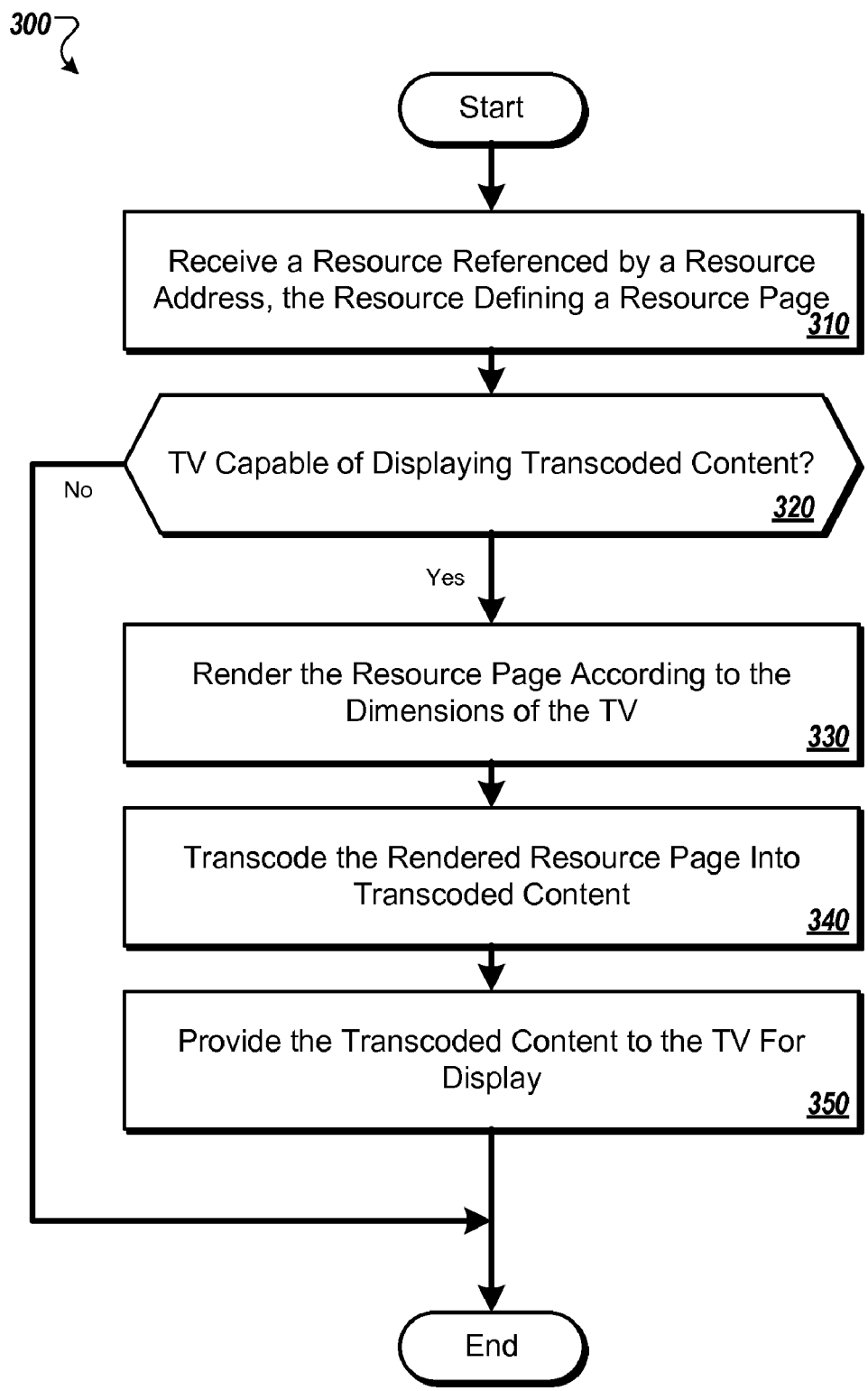
FIG. 3 is flow chart that shows an example of a process for providing content from an open network to a television processing device.

FIG. 3 is flow chart that shows an example of a process 300 for providing content from an open network to a television processing device. In some implementations, the process 300 can be performed by the user device 116 of FIG. 1.

The process 300 starts at step 310, when a resource, referenced by a resource address, is received. The resource defines a resource page. For example, the resource can be the web page 204 of FIG. 2, which is associated with the network address 206 and defines the content display area 207.

At step 320, the user device determines whether the television device in data communication with the user device has a processing capability to display transcoded content. For example, the television processing device 220 may not include the CODEC module 222, and therefore may not be capable of decoding the content 208 as encoded by the CODEC 222. The user device can make the determination by querying the television device for its capabilities, by referencing an external database of the television provider that describes the capabilities of the television device, or by sending a portion of the content to the television processing device and monitoring for an error condition or a successful decoding of the content by the television processing device. For example, the user device 202 can use a UPnP protocol to query the television processing device 220 to retrieve information about the decoding capabilities of the television processing device 220. In another example, the user device 202 can query the television processing device 220 to determine the make and model of the television processing device 220, and then use the make and model information to a query, over the Internet, a database of the manufacturer that provides information about the decoding capabilities of various television processing devices.

If at step 320, it is determined that the television device is not capable of retrieving and decoding the content, then the process ends. Conversely, if it is determined at step 320 that the television device is capable of retrieving and decoding the content, then the resource page is rendered according to the dimensions of the television device. In some implementations, rendering the resource page according to the dimensions of the television device can comprise rendering the resource page according to display dimensions of the television device that are different from the display dimensions of the user device. For example, the user device 202 may display the web page 204 using a screen having 470 dp×320 dp, while the display device 230 has a screen having 1920 dp×1080 dp. As such, the user device 202 can modify the display ratio, layout, scale, color depth, or any other appropriate attribute of the content 208 to accommodate the screen of the display device 230.

At step 330, the rendered resource page is transcoded into transcoded content for which the television has the processing capability to display. For example, the CODEC module 222 can transcode the content 208 into a media stream that the CODEC module 223 can decode. In some implementations, the user device can transcode the rendered resource page into transcoded content for which the television has the processing capability to display comprised generating transcoding the rendered resource page into an MPEG stream.

At step 340, the transcoded content is provided to the television device for display on the television device. For example, the content 208 transcoded by the CODEC module 222 is provided to the rendering module 224, decoded by the CODEC module 223, and rendered for presentation on the display device 230.

In some implementations, a user input interface can be displayed on the display device, and user interactions with the transcoded content displayed on the television device can be controlled by use of the user input interface. For example, the user control UI 240 can provide a keyboard, pointer input, or other interfaces with which the user can interact with the content 208 shown by the display device 230. In some implementations, the user input interface may not be transcoded into the transcoded content provided to the television device. For example, the user device 202 may present the user control UI 240 as a virtual keyboard on the display of the user device 202, but not cause the keyboard to be displayed by the display device 230.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a tangible or non-transitory computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A user device, comprising:
a data processing apparatus;
a communication subsystem that transmits and receives data over one or more digital data networks and one or more media;
a display device; and
a memory device storing instructions that when executed by data processing apparatus cause the user device to perform operations comprising:
receiving a resource referenced by a resource address, wherein the resource defines a resource page;
sending a query for data specifying a processing capability of a television device to decode for display on the television device transcoded video content encoded in a digital streaming video format by the user device, wherein the television device is a device that is separate from the user device;
receiving, in response to the query, data specifying the processing capability of the television device, including dimensions of the television device;
in response to receiving data specifying the processing capability of the television device:
rendering, at the user device, the resource page according to the dimensions of the television device;
transcoding the rendered resource page into the transcoded video content in the digital streaming video format for which the television device has the processing capability to decode and display; and
streaming the transcoded video content encoded in the digital streaming video format from the user device to the television device for decoding and display on the television device;
displaying a user input interface on the display device; and
controlling user interactions with the transcoded video content displayed on the television device by use of the user input interface;

wherein the user input interface is not transcoded into the transcoded video content provided to the television device.

2. The device of claim 1, wherein transcoding the rendered resource page into the transcoded video content for which the television has the processing capability to decode and display comprises transcoding the rendered resource page into an MPEG stream.

3. The device of claim 1, wherein rendering the resource page according to the dimensions of the television device comprise rendering the resource page according to display dimensions of the television device that are different from the display dimensions of the user device.

4. The system of claim 1, wherein sending the query for data specifying the processing capability of the television device comprises querying the television device for data specifying a CODEC processing capability of the television device.

5. A method comprising:
  receiving, at a user device, a resource referenced by a resource address, wherein the resource defines a resource page;
  sending a query for data specifying a processing capability of a television device to decode for display on the television device transcoded video content encoded in a digital streaming video format by the user device, wherein the television device is a device that is separate from the user device;
  receiving, in response to the query, data specifying the processing capability of the television device, including dimensions of the television device;
  in response to receiving data specifying the processing capability of television device:
    rendering, by the user device, the resource page according to the dimensions of the television device;
    transcoding, by the user device, the rendered resource page into the transcoded video content in the digital streaming video format for which the television device has the processing capability to decode and display; and
    streaming, by the user device, the transcoded video content encoded in the digital streaming video format from the user device to the television device for decoding and display on the television device;
  displaying a user input interface on a display device of the user device; and
  controlling user interactions with the transcoded video content displayed on the television device by use of the user input interface;
  wherein the user input interface is not transcoded into the transcoded video content provided to the television device.

6. The method of claim 5, wherein transcoding the rendered resource page into the transcoded video content for which the television has the processing capability to decode and display comprises transcoding the rendered resource page into an MPEG stream.

7. The method of claim 5, wherein rendering the resource page according to the dimensions of the television device comprises rendering the resource page according to display dimensions of the television device that are different from the display dimensions of the user device.

8. The method of claim 5, wherein sending the query for data specifying the processing capability of the television device comprises querying the television device for data specifying a CODEC processing capability of the television device.

9. A computer program stored in a computer readable storage device, the computer program comprising instructions that when executed by a user device cause the user device to perform operations comprising:
  receiving, at a user device, a resource referenced by a resource address, wherein the resource defines a resource page;
  sending a query for data specifying a processing capability of a television device to decode for display on the television device transcoded video content encoded in a digital streaming video format by the user device, wherein the television device is a device that is separate from the user device;
  receiving, in response to the query, data specifying the processing capability of the television device, including dimensions of the television device;
  in response to receiving data specifying the processing capability of the television device:
    rendering, by the user device, the resource page according to the dimensions of the television device;
    transcoding, by the user device, the rendered resource page into the transcoded video content in the digital streaming video format for which the television device has the processing capability to decode and display; and
    streaming, by the user device, the transcoded video content encoded in the digital streaming video format from the user device to the television device for decoding an display on the television device;
  displaying a user input interface on a display device of the user device; and
  controlling user interactions with the transcoded video content displayed on the television device by use of the user input interface;
  wherein the user input interface is not transcoded into the transcoded video content provided to the television device.

10. The computer program product of claim 9, wherein transcoding the rendered resource page into the transcoded video content for which the television has the processing capability to decode an display comprises generating transcoding the rendered resource page into an MPEG stream.

11. The computer program product of claim 9, wherein rendering the resource page according to the dimensions of the television device comprises rendering the resource page according to display dimensions of the television device that are different from the display dimensions of the user device.

12. The computer program product of claim 9, wherein sending the query for data specifying the processing capability of the television device comprises querying the television device for data specifying a CODEC processing capability of the television device.

* * * * *

UNITED STATES PATENT AND TRADEMARK OFFICE
CERTIFICATE OF CORRECTION

PATENT NO.       : 8,332,897 B1
APPLICATION NO.  : 13/291557
DATED            : December 11, 2012
INVENTOR(S)      : Simon M. Rowe Page 1 of 1

It is certified that error appears in the above-identified patent and that said Letters Patent is hereby corrected as shown below:

In the Claims:

Column 12, line 47, in Claim 10, delete "an" and insert -- and --, therefor.

Signed and Sealed this
Thirtieth Day of April, 2013

Teresa Stanek Rea
*Acting Director of the United States Patent and Trademark Office*